United States Patent
Sagar et al.

(10) Patent No.: US 9,323,318 B2
(45) Date of Patent: Apr. 26, 2016

(54) SCENARIO POWER MANAGEMENT

(71) Applicant: MICROSOFT TECHNOLOGY LICENSING, LLC, Redmond, WA (US)

(72) Inventors: Abhishek Sagar, Redmond, WA (US); Tristan Anthony Brown, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 220 days.

(21) Appl. No.: 13/914,799

(22) Filed: Jun. 11, 2013

(65) Prior Publication Data
US 2014/0365787 A1  Dec. 11, 2014

(51) Int. Cl.
*G06F 1/32* (2006.01)
*G06F 11/30* (2006.01)
*G06F 11/34* (2006.01)
*G06F 9/44* (2006.01)

(52) U.S. Cl.
CPC .......... *G06F 1/3287* (2013.01); *G06F 1/3203* (2013.01); *G06F 1/3296* (2013.01); *G06F 9/4411* (2013.01); *G06F 11/3055* (2013.01); *G06F 11/3409* (2013.01)

(58) Field of Classification Search
CPC ... G06F 1/3203; G06F 1/3296; G06F 9/4411; G06F 11/3055; G06F 11/3409
USPC ................................. 713/300, 320, 323, 324
See application file for complete search history.

(56) References Cited

U.S. PATENT DOCUMENTS

| | | | |
|---|---|---|---|
| 7,861,099 B2 | 12/2010 | Theocharous | |
| 7,917,773 B2 | 3/2011 | Xu | |
| 8,261,102 B2 | 9/2012 | Cheng | |
| 8,381,215 B2 | 2/2013 | Johnson | |
| 2011/0208984 A1 | 8/2011 | Naware | |
| 2011/0276770 A1* | 11/2011 | Zhu et al. | 711/160 |
| 2012/0271472 A1 | 10/2012 | Brunner et al. | |

(Continued)

OTHER PUBLICATIONS

Pettis, et al., "Automatic Run-Time Selection of Power Policies for Operating Systems"—Published Date: Mar. 6, 2006, Proceeding: In the Proceedings of Design, Automation and Test in Europe, pp. 6 http://ieeexplore.ieee.org/stamp/stamp.jsp?tp=&arnumber=1656934.

(Continued)

*Primary Examiner* — Michael J Brown
(74) *Attorney, Agent, or Firm* — John Jardine; Raghu Chinagudabha; Micky Minhas

(57) ABSTRACT

One or more techniques and/or systems are provided for dynamically applying power policies to a computing environment. For example, a computing environment may comprise one or more activity components (e.g., a display driver, an audio driver, an application, etc.) that may provide status information used to identify a scenario (e.g., a video game scenario, a full screen video playback scenario, etc.) that is activated for the computing environment. A power policy assigned to a currently identified scenario may be applied to the computing environment to dynamically improve performance and/or power conservation, for example. Activity components, scenarios, and/or power policies may be maintained in an extensible manner such that activity components, scenarios, and/or power polices may be added, removed, and/or modified by merely updating corresponding data structures, such as tables or registry keys, as opposing to updating power management software code.

20 Claims, 9 Drawing Sheets

(56) References Cited

U.S. PATENT DOCUMENTS

2012/0271481 A1 10/2012 Anderson et al.
2012/0323400 A1 12/2012 Sankar et al.

OTHER PUBLICATIONS

Benini, et al., "Policy Optimization for Dynamic Power Management"—Published Date: Jun. ##, 1999 Proceeding: In the IEEE Transactions on Computer-Aided Design of Integrated Circuits and Systems, vol. 18, No. 6, pp. 21, http://ieeexplore.ieee.org/stamp/stamp.jsp?tp=&arnumber=766730.

Growe-Kuska, et al., "Scenario Reduction and Scenario Tree Construction for Power Management Problems"—Published Date: Jun. 23, 2003, Proceeding: In Proceeding of the IEEE Bologna PowerTech Conference, pp. 7 http://ieeexplore.ieee.org/stamp/stamp.jsp?tp=&arnumber=1304379.

Li, et al., "Run-time Modeling and Estimation of Operating System Power Consumption"—Published Date: Jun. 10, 2003 Proceeding: In Proceedings of the International Conference on Measurements and Modeling of Computer Systems, pp. 12, http://lca.ece.utexas.edu/pubs/tao-sigmetrics-2003.pdf.

"PPM in Windows 7 and Windows Server 2008 R2"—Published Date: Oct. 19, 2012, pp. 2 http://msdn.microsoft.com/library/windows/hardware/gg566941.aspx.

Int. Search Report cited in PCT Application No. PCT/US2013/060757 dated Jan. 3, 2014, 13 pgs.

\* cited by examiner

SCENARIO POWER MANAGEMENT

BACKGROUND

Many computing devices, such as desktops, laptops, smart phones, and tablets, are developed around conserving power while providing desired performance and responsiveness for an improved user experience. In an example, when a device is not used for some time, such as ten minutes, the device may be placed into a sleep state that may significantly reduce application activity, and thus may result in improved power conservation. In another example, an operating system of a computing device may have one or more hardcoded power consumption plans that may adjust screen brightness, place a hard drive into a sleep state, etc. based upon a user selection of a power consumption plan and/or based upon a determination as to whether the computing device is operating on a battery or is plugged into a power outlet.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for dynamically applying a power policy to a computing environment are provided herein. For example, a computing environment (e.g., a tablet device, a mobile device, a laptop, a desktop computer, etc.) may be associated with one or more activity components. An activity component (e.g., an entity that defines an activity) may comprise a software component, a hardware component, an application, a driver, an operating system component, functionality associated with a component (e.g., audio playback functionality of an audio driver), and/or any other component that may actively operate within the computing environment (e.g., an audio driver, a photo sharing application, a graphics subsystem, a video renderer, a desktop window manager, etc.). Status information may be received from the one or more activity components. In an example, status information may indicate whether an activity component is activated, deactivated, and/or has some other (e.g., more granular) state, such as an activate low power state (e.g., whether an audio driver is currently performing audio playback). In another example, status information may indicate whether an activity component state of an activity component is activated or deactivated (e.g., the audio driver may indicate that offloaded audio playback is activated, and that non-offloaded audio playback is deactivated). Such status information may be used to fine tune performance and/or power parameters of the computing environment.

In an example, a scenario evaluation may be performed for the computing environment (e.g., based upon receiving a notification from an activity component that a status of the activity component has changed, thus updating status information for the computing environment). The scenario evaluation may comprise evaluating status information provided by one or more activity components of the computing environment to determine whether the status information satisfies a scenario definition for a scenario. For example, one or more scenarios (e.g., a video playback scenario, a full screen video playback scenario, a video batching scenario, a low power consumption connected standby state scenario, a monitor off scenario, etc.) may be defined based upon activation, deactivation, and/or some other (e.g., more granular) state, such as an activate low power state of activity components and/or activity component states. For example, a scenario definition for an audio playback scenario (e.g., an audio, but not video, playback such as an internet radio) may specify that audio playback is to be activated, video playback is to be deactivated (e.g., activation may otherwise indicate video playback as opposed to audio only playback), a low power consumption connected standby state is to be deactivated, etc.

Responsive to satisfaction of the scenario definition (e.g., the audio playback is activated, and the video playback and low power consumption connected standby state are deactivated), a proposed power policy assigned to the scenario may be identified. The proposed power policy may specify a variety of power settings, such as processor performance settings (e.g., decreased CPU clock speed for power conservation, increased processor throttling for improved performance, etc.), graphics processing unit performance settings, display settings (e.g., a screen brightness), a hardware throttling setting, a network connectivity setting (e.g., disable network adapter for power conservation), and/or a plethora of other settings (e.g., settings that may be implemented by a kernel power manger, an operating system, hardware, software, an application, a driver, etc.). In this way, the proposed power policy may be dynamically applied to the computing environment as a current power policy.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
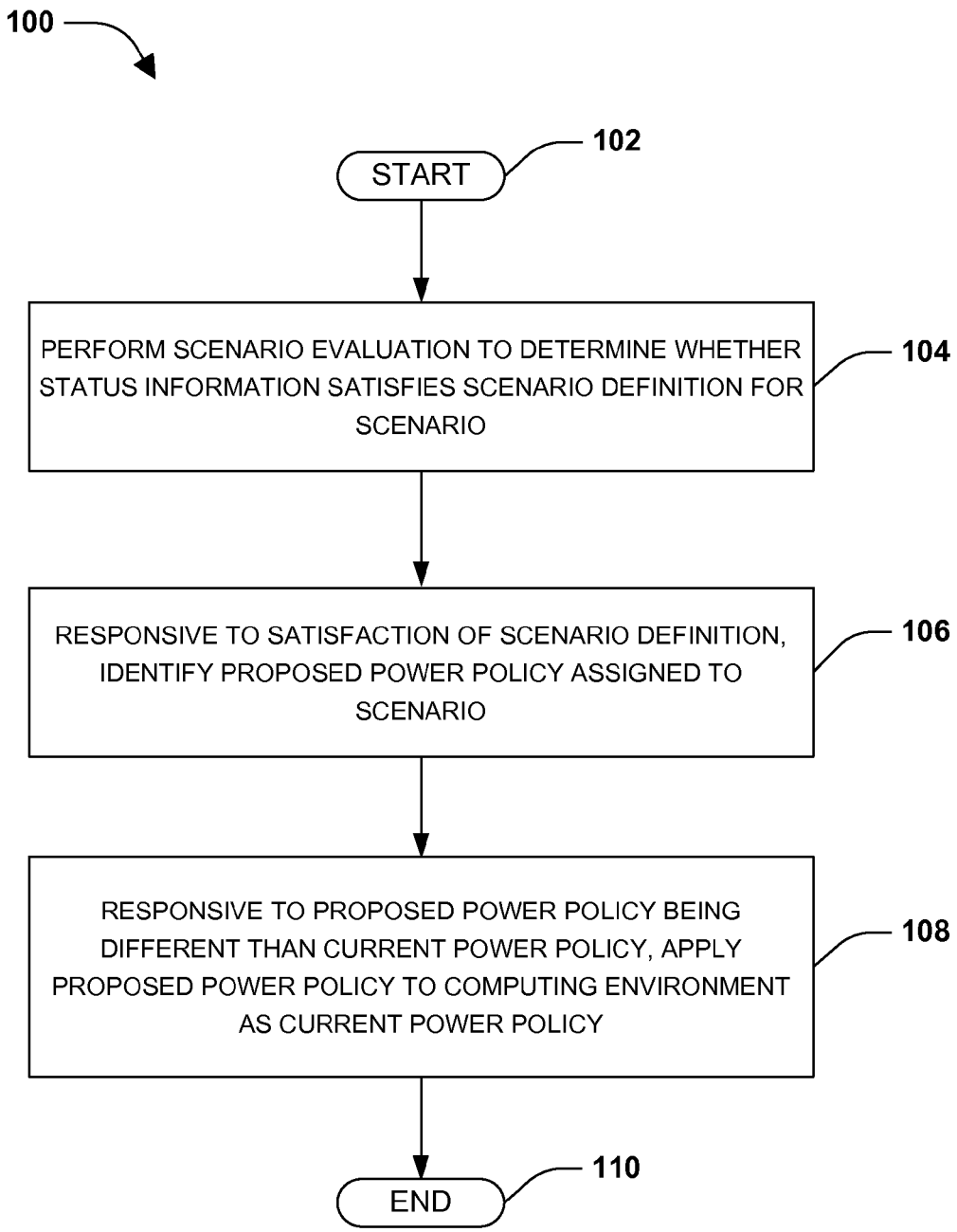
FIG. 1 is a flow diagram illustrating an exemplary method of dynamically applying a power policy to a computing environment.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of dynamically applying a power policy to a computing environment is illustrated by an exemplary method 100 of FIG. 1. At 102, the method starts. A computing environment may comprise one or more activity components (e.g., an audio driver, a graphics card, a video renderer, an application, a desktop windows manager, etc.) that may participate in scenario-based power management by providing status information that may be used to identify a scenario associated with a power policy that may be dynamically applied to the computing environment to, for example, enhance performance and/or conserve power. In an example, a set of activity components, from which status information may be received for identification of a scenario, may be maintained within an activity component data structure. In this way, upon receiving status information from an activity component (e.g., a video renderer may specify that full screen video is being played), the activity component may be identified within the activity component data structure. The activity component data structure may be updated to add, remove, and/or modify activity components (e.g., a new video driver may be installed, an audio driver may be updated with new functionality correspond to a new activity component state, etc.).

Status information received from such activity components may be used to identify a scenario for which a particular power policy may enhance performance and/or power conservation. In an example, a set of scenarios may be maintained within a scenario data structure comprising one or more scenario entries defining scenarios. A scenario entry within the scenario data structure may comprise a scenario definition that defines a scenario. For example, a scenario definition for an audio playback scenario may specify one or more compliance activity component states that are to be satisfied for satisfaction of the scenario definition (e.g., an audio driver is to be in an offloaded audio playback state), one or more ignored activity component states that are optional for satisfaction of the scenario definition (e.g., a current state of a joystick controller may not affect satisfaction of the scenario definition), and/or one or more disabling activity component states indicating that the scenario definition is not capable of being satisfied (e.g., a video playback state may indicate that a video playback scenario is activated as opposed to merely an audio playback scenario). The scenario data structure may be updated to add, remove, and/or modify scenarios (e.g., a new scenario entry may be made for a 3D video game scenario). In an example, the scenario data structure may comprise a registry key such that a scenario definition may be specified within portions of the registry key (e.g., a registry key within a registry utilized by an operating system).

Scenarios may be associated with power policies, such as processor throttling power settings, screen brightness power settings, network connectivity power settings, device activity power settings, and/or a wide variety of other power settings that may affect power consumption and/or performance. In this way, a power policy, which may reduce power consumption and/or enhance performance, may be implemented for a current scenario. Thus, power management may be dynamically adjusted based upon various scenarios that may become active during operation of the computing environment. In an example, a set of power policies may be maintained within a power policy data structure comprising one or more power policy entries defining power policies settings that may be applied to the computing environment. For example, a first power policy may define an association between a first scenario and a first power policy (e.g., a processor throttling power policy may be associated with a full screen video playback scenario). In an example, a power policy may be defined based upon a policy definition specified by an operating system, specified through a policy engine plug-in (e.g., through which third parties may specify a power policy), discovered at boot time and/or discovered (e.g., dynamically) after boot time. The power policy data structure may be updated to add, remove, and/or modify power polices.

At 104, a scenario evaluation may be performed for the computing environment. For example, the scenario evaluation may be performed based upon a notification from an activity component that a status of an activity component has changed. In an example, the scenario evaluation may be applied at runtime during operation of a computing device. The scenario evaluation may evaluate status information (e.g., an indication as to whether an activity component and/or an activity component state is activated or deactivated, such as whether a video renderer is performing full screen video playback, is idle, or is playing a video within a window) provided by one or more activity components of the computing environment to determine whether the status information satisfies a scenario definition for a scenario. For example, a peer-to-peer conference scenario may be identified based upon status information satisfying a peer-to-peer conference scenario definition (e.g., network activity, video playback activity, audio playback activity, execution of a conference app, microphone activity, and/or a variety of other status information provided by activity components may be evaluated). The peer-to-peer conference scenario definition may specify that one or more compliance activity components states are to be satisfied for satisfaction of the peer-to-peer conference scenario definition (e.g., video playback, audio playback, microphone activity, etc.). The peer-to-peer conference scenario definition may specify that one or more ignored activity components states are optional for satisfaction of the peer-to-peer conference scenario definition (e.g., mouse activity). The peer-to-peer conference scenario definition may specify that one or more disabling activity component states may indicate that the peer-to-peer conference scenario definition is not capable of being satisfied (e.g., a lack of network connectivity).

At 106, responsive to satisfaction of the scenario definition, a proposed power policy assigned to the scenario may be identified. For example, the power policy data structure may be queried with the scenario to identify the power policy assigned to the scenario. At 108, responsive to the proposed power policy being different than a current power policy, the proposed power policy is applied to the computing environment as the current power policy. In an example, the proposed power policy may be applied at runtime during operation of the computing device, which may dynamically improve performance of the computing system and/or power consumption. In an example, a power policy may comprise one or more power policy settings that may be applied to the computing environment and/or implemented by various components such as an operating system, an application, a driver, a hardware component, an operating system component, a kernel power manager, a processor, etc.

In an example, the set of scenarios within the scenario data structure may be defined so that conflicts between scenarios may be mitigated (e.g., merely one scenario may be satisfied at a time based upon current status information). In another example, conflict resolution may be performed where status information satisfies multiple scenario definitions. For example, responsive to determining that the status information satisfies the scenario definition for the scenario and that the status information satisfies a second scenario definition for a second scenario, a collision detection may be performed to determine whether a conflict exists (e.g., a power policy for the scenario may specify a 50% screen brightness, whereas a second power policy for the second scenario may specify a 90% brightness). The conflict may be resolved to identify a resolved power policy that may be applied to the computing environment as the current power policy (e.g., a current power policy may be maintained, a default power policy may be selected, an average power policy setting value (e.g., such as 70%) may be implemented, a power policy setting value for improved power consumption may be implemented, a power policy setting value for improved performance may be implemented, etc.).

In this way, activity components, scenarios, and/or power policies may be maintained within easily modifiable data structures (e.g., tables, registry keys, etc.), which may provide extensibility for managing power of the computing environment (e.g., a new scenario may be added by updating the scenario data structure, as opposed to updating code of a power management component). Thus, performance and/or power consumption may be improved at runtime by applying power policies based upon currently detected scenarios of the computing environment. At 110, the method ends.

Figure 2:
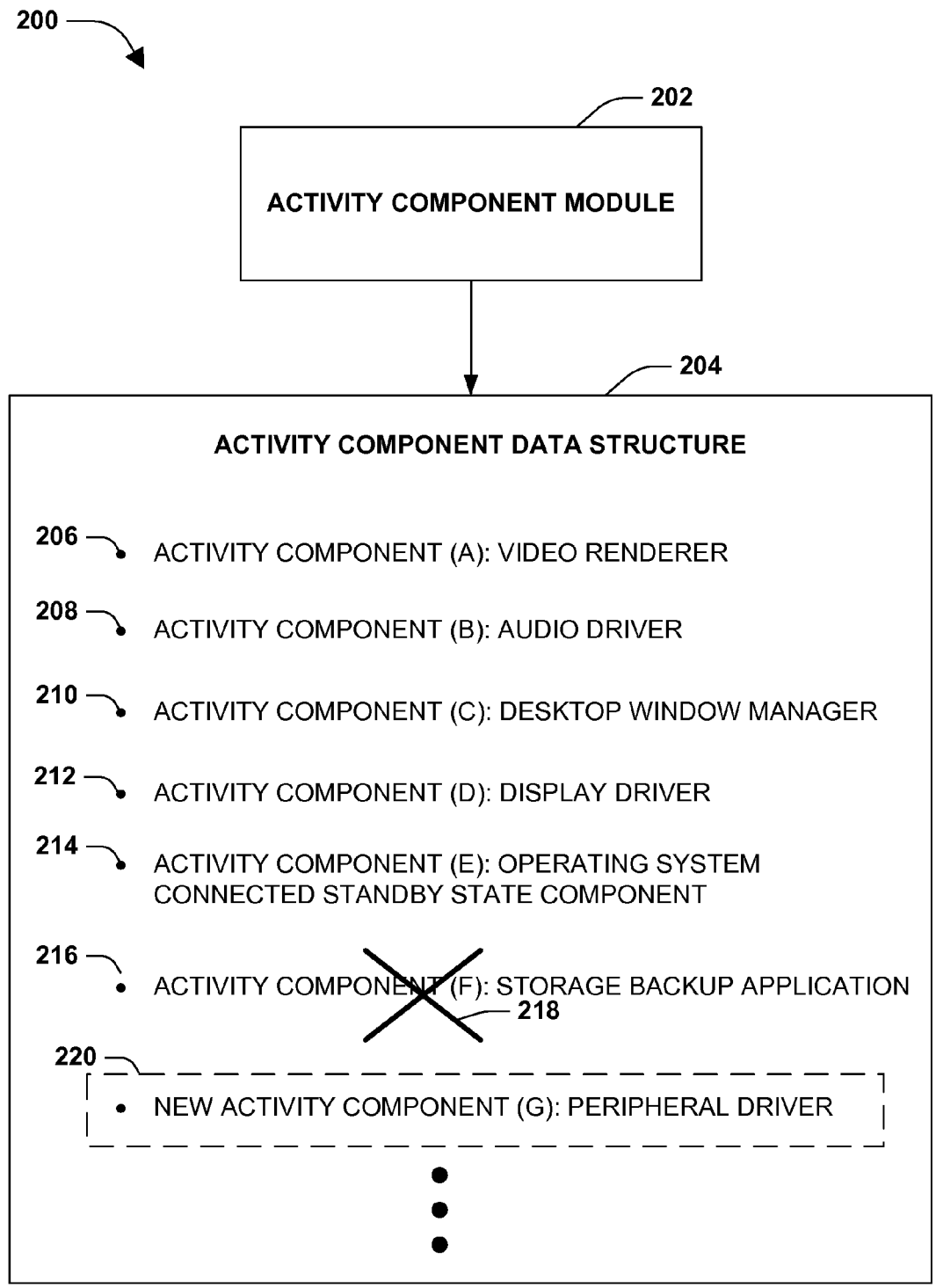
FIG. 2 is an illustration of an example of an activity component data structure.

FIG. 2 illustrates an example 200 of an activity component data structure 204. It may be appreciated that the activity component data structure 204 may be implemented through a variety of data structures, such as database tables, registry keys, and/or other data structures, and that example 200 is merely a simplified example for illustrative purposes. An activity component module 202 may be configured to maintain the activity component data structure 204 comprising one or more activity component entries. For example, the activity component data structure 204 may comprise an activity component (A) entry 206 for a video renderer, a second component (B) entry 208 for an audio driver, an activity component (C) entry 210 for a desktop window manager, an activity component (D) entry 212 for a display driver, an activity component (E) entry 214 for an operating system connected standby state component, an activity component (F) entry 216 for a storage backup application, and/or other scenario entries for various drivers, operating system components, hardware devices, applications, etc.

The activity component module 202 may be configured to maintain the activity component data structure 204 by dynamically adding, removing, and/or modifying activity component entries. In an example, the activity component module 202 may remove 218 an activity component entry, such as the activity component entry (F) 216. In another example, the activity component module 202 may add a new activity component entry to provide support for a new activity component, such as a new activity component (G) entry 220 for a peripheral driver (e.g., a user may have installed a new motion detection device). In this way, support for activity components may be dynamically provided with little to no modification to code of a power management component (e.g., merely the activity component data structure 204, such as a table, may be modified as opposed to updating code of the power management application such as a kernel power manager of an operating system).

Figure 3:
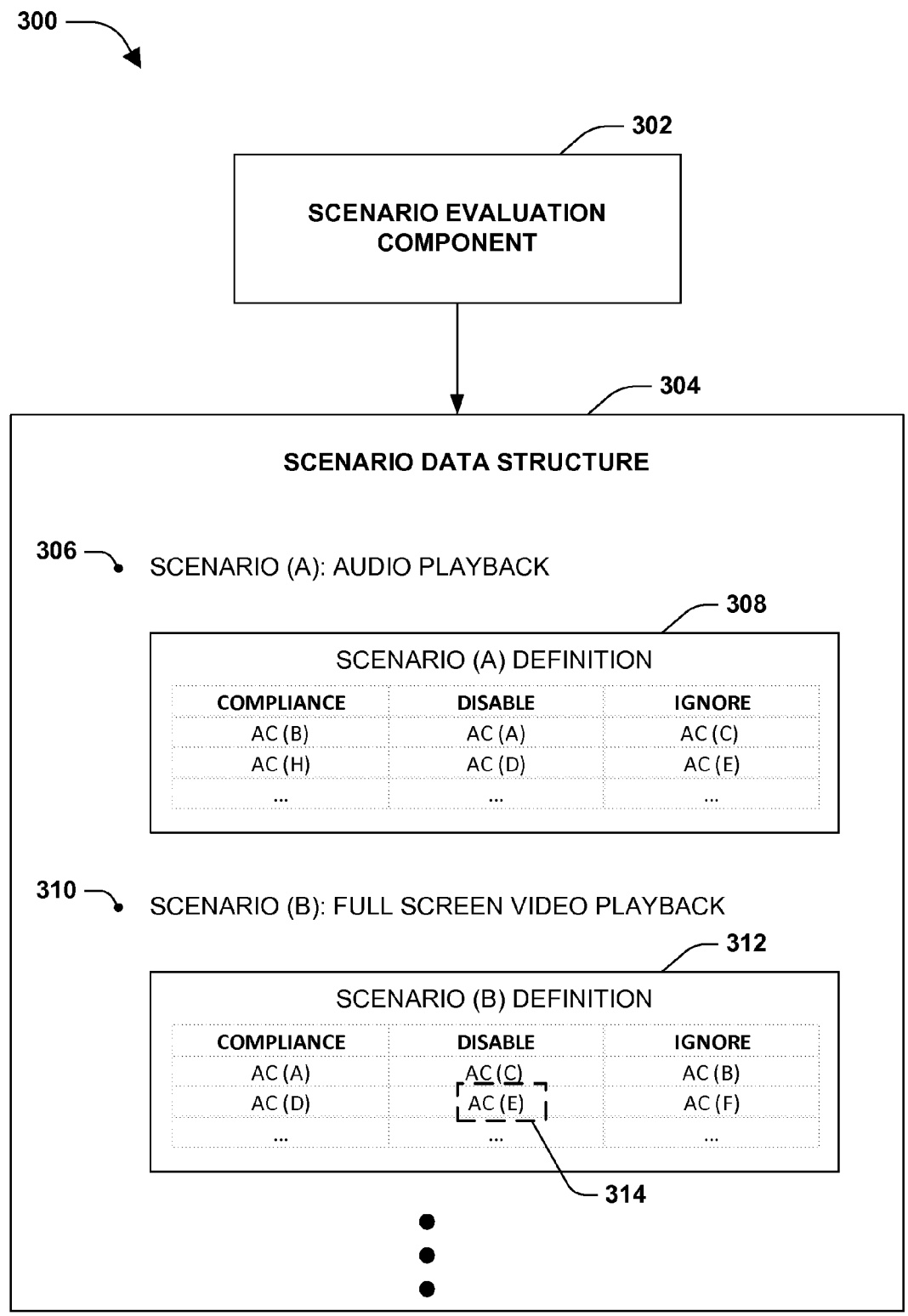
FIG. 3 is an illustration of an example of a scenario data structure.

FIG. 3 illustrates an example 300 of a scenario data structure 304. It may be appreciated that the scenario data structure 304 may be implemented through a variety of data structures, such as database tables, registry keys, and/or other data structures, and that example 300 is merely a simplified example for illustrative purposes. A scenario evaluation component 302 may be configured to maintain the scenario data structure 304 comprising one or more scenario entries. For example, the scenario data structure 304 may comprise a scenario (A) entry 306 for an audio playback scenario (e.g., a scenario where audio, but not video, is being played), a scenario (B) entry 310 for a full screen video playback scenario (e.g., a scenario where video is being played in a full screen mode), and/or other scenario entries for other scenarios (e.g., a video game scenario, a peer-to-peer conferencing scenario, a storage backup scenario, a virus scan scenario, etc.). In an example, the scenario data structure 304 may be generated at runtime (e.g., in memory) such that scenarios and/or relationship between scenarios and activity components may be evaluated and/or defined at runtime.

The scenario data structure 304 may comprise scenario definitions for the one or more scenario entries. In an example, a scenario (A) definition 308 for the audio playback scenario may specify that one or more compliance activity component states (e.g., an activity component (B) such as an audio driver and an activity component (H) such as a speaker) are to be activated for satisfaction of the scenario (A) definition 308 used to determine whether the audio playback scenario is activated. The scenario (A) definition 308 may specify that one or more disabling activity component states (e.g., an activity component (A) such as a video renderer and an activity component (D) such as a display driver indicating full screen video playback as opposed to merely audio playback) indicating that the scenario (A) definition 308 is not capable of being satisfied (e.g., because the audio playback scenario is defined for audio, but not video, playback, such as listening to an internet radio station, and thus the audio playback scenario would not be capable of being satisfied if a video renderer and/or display driver are activated). The scenario (A) definition 308 may specify that one or more ignored activity component states (e.g., activity component (C) and activity component (E)) are optional (e.g., ignored) for satisfaction of the scenario (A) definition 308.

It may be appreciated that status information provided by an activity component and/or a scenario definition, for example, may specify various states, such as activated, deactivated, activated—low power, a integer value, and/or a variety of other states, and is thus not limited to a Boolean type value of activated and deactivated (e.g., foregoing examples are not meant to be limiting).

The scenario evaluation component 302 may be configured to maintain the scenario data structure 304 by dynamically adding, removing, and/or modifying scenario entries. In an example, the scenario evaluation component 302 may be configured to modify a scenario definition, such as a scenario (B) definition 312 for the full screen video playback scenario. For example, the scenario evaluation component 302 may add 314 a compliance activity component state to the scenario (B) definition 312 (e.g., activity component (E), such as an operating system connected standby state component, may be added because the computing environment would not be playing full screen video if the computing environment was is a low power connected standby state). In this way, support for scenarios may be dynamically provided with little to no modification to a power management application (e.g., merely the scenario data structure 304, such as a table, may be modified as opposed to updating code of the power management application such as a kernel power manager of an operating system).

Figure 4:
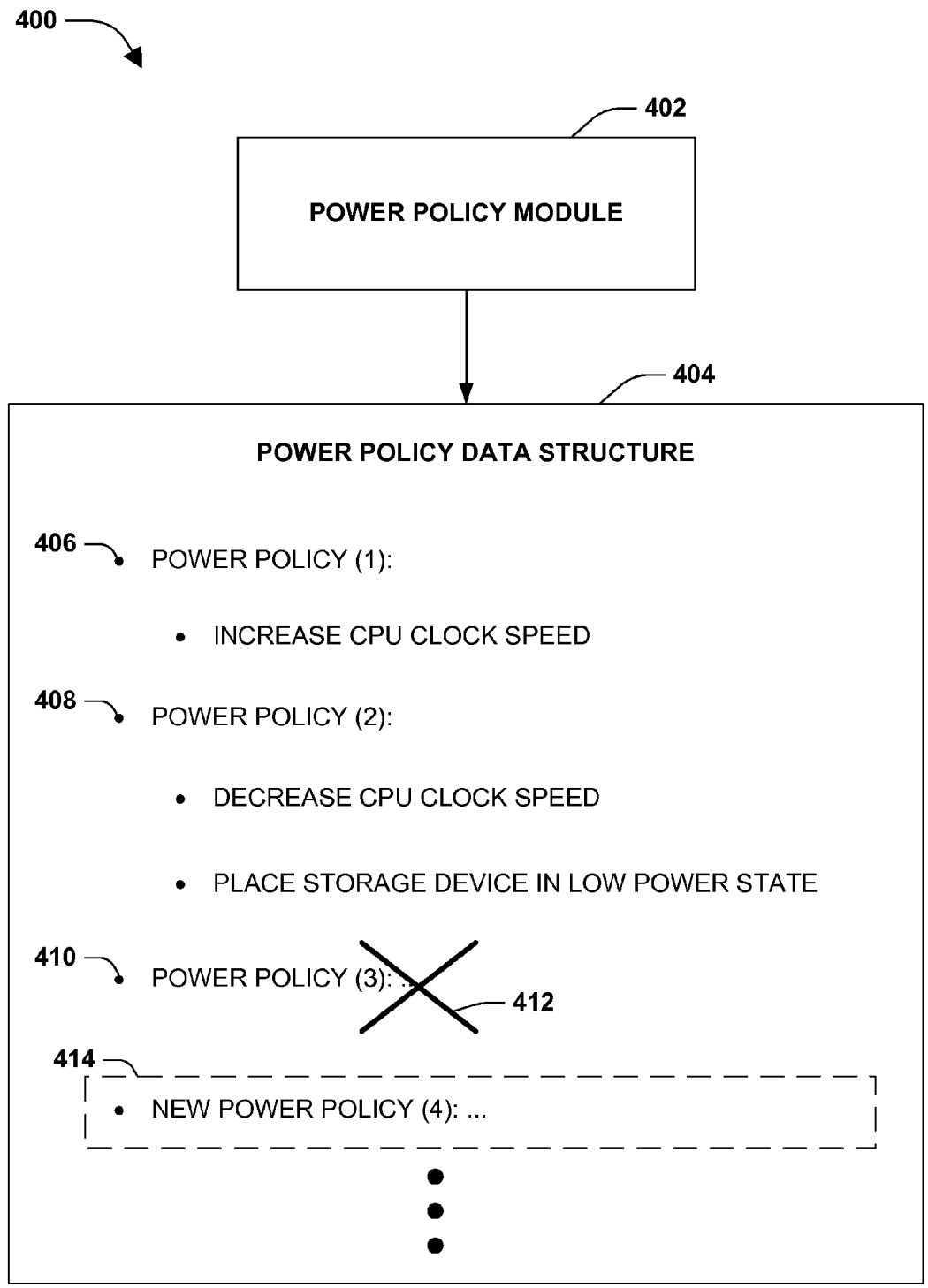
FIG. 4 is an illustration of an example of a power policy data structure.

FIG. 4 illustrates an example 400 of a power policy data structure 404. It may be appreciated that the power policy data structure 404 may be implemented through a variety of data structures, such as database tables, registry keys, and/or other data structures, and that example 400 is merely a simplified example for illustrative purposes. A power policy module 402 may be configured to maintain the power policy data structure 404 comprising one or more power policy entries. For example, the power policy data structure 404 may comprise a power policy (1) entry 406 for an increased CPU clock speed, a power policy (2) entry 408 for a decreased CPU clock speed and a low power state for a storage device, a power policy (3) entry 410, and/or other power policy entries for other power polices. That power policy data structure 404 may comprise other information, not illustrated, such as assignments of scenarios to power policies (e.g., a scenario (A) may be assigned to a power policy (5) such that the power policy (5) is to be implemented when the scenario (A) is activated).

The power policy module 402 may be configured to maintain the power policy data structure 404 by dynamically adding, removing, and/or modifying power policies. In an example, the power policy module 402 may be configured to remove 412 a power policy entry, such as the power policy entry (3) 410. In another example, the power policy module 402 may be configured to add a new power policy entry to provide support for a power policy, such as a new power policy (4) 414. In this way, support for power policies may be dynamically provided with little to no modification to a power management application (e.g., merely the power policy power policy data structure 404, such as a table, may be modified as opposed to updating code of the power management application such as a kernel power manager of an operating system).

Figure 5:
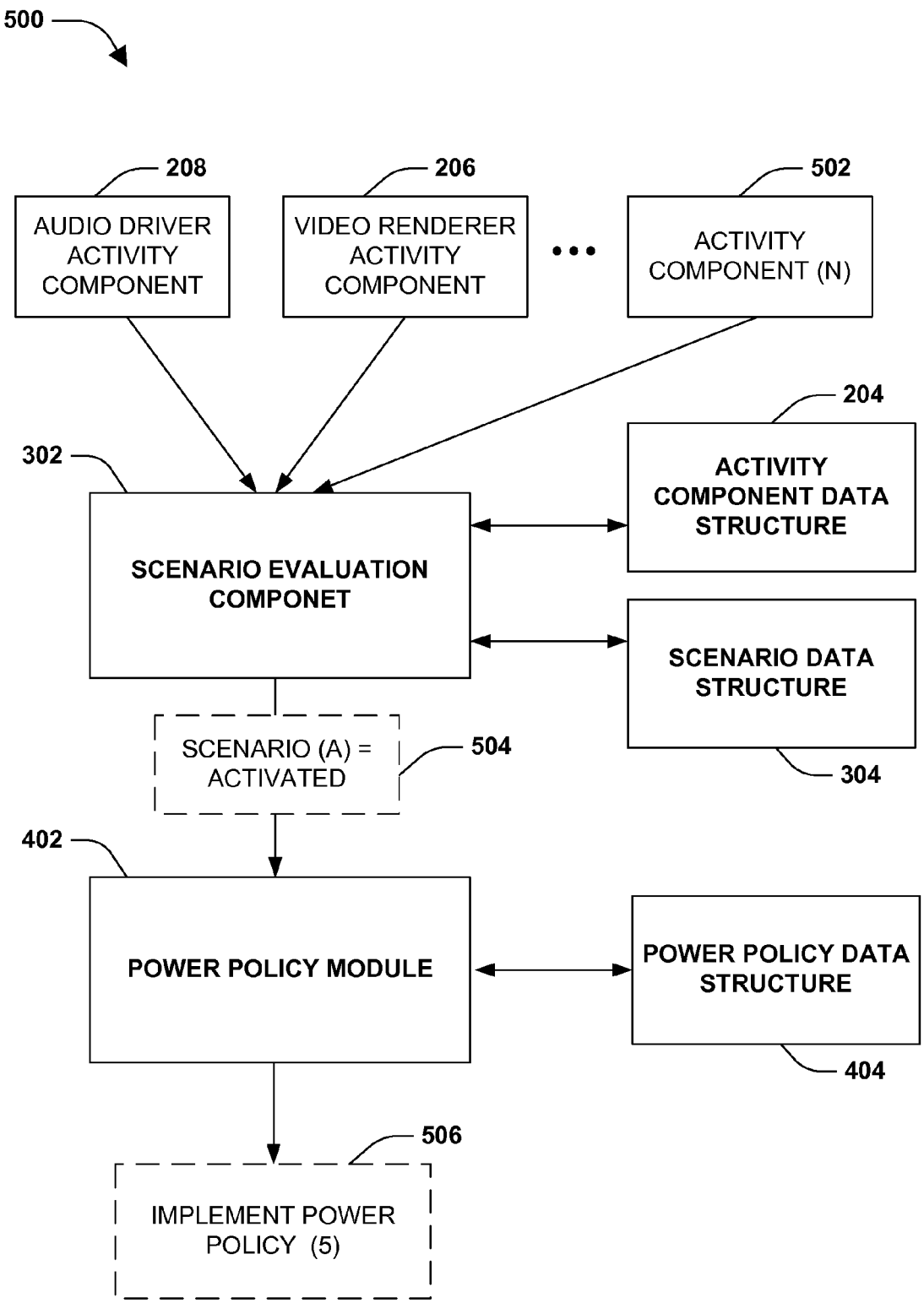
FIG. 5 is a component block diagram illustrating an exemplary system for dynamically applying a power policy to a computing environment.

FIG. 5 illustrates an example of a system 500 for dynamically applying a power policy to a computing environment. The system 500 may comprise a scenario evaluation component 302 and/or a power policy module 402. The scenario evaluation component 302 may be configured to receive status information from one or more activity components, such as an audio driver activity component 208, a video renderer activity component 206, and/or other activity components such as activity component (N) 502 (e.g., activity components specified within an activity component data structure 204).

The scenario evaluation component may be configured to perform a scenario evaluation for a computing environment (e.g., a tablet, a mobile phone, a desktop computer, etc.). The scenario evaluation component 302 may evaluate status information provided by one or more activity components to determine whether the status information satisfies a scenario definition for a scenario (e.g., a scenario defined within a scenario data structure 304). For example, the scenario evaluation component 302 may determine that a scenario (A) (e.g., an audio, but not video, playback scenario) may be activated 504 based upon status information satisfying a scenario (A) definition where an audio driver activity component is activated, a video renderer activity component is not activated, etc.

The power policy module 402 may be configured to identify a proposed power plan that is assigned to the scenario. For example, the power policy module 402 may consult a power policy data structure 404 to identify that a power policy (5) is assigned to the scenario (A). The power policy module 402 may be configured to implement 506 the power policy (5) based upon the scenario (A) being activated 504. For example, an application, a driver, hardware, an operating system component, etc. may be invoked, disabled, throttled, etc. to implement one or more power settings specified by the power policy (5). In an example, a power policy may comprise values that may be defined based upon, for example, various platform characteristics of the computing environment. For example, a max CPU performance value may depend upon whether the device is a tablet, a phone, a laptop, etc. (e.g., first value for a tablet, second value for phone, third value for laptop, etc.). In this manner, depending upon variations among different computing environments, there may be different power policies for a same scenario (e.g., where variations among power policies are a function of differences between computing environments).

Figure 6:
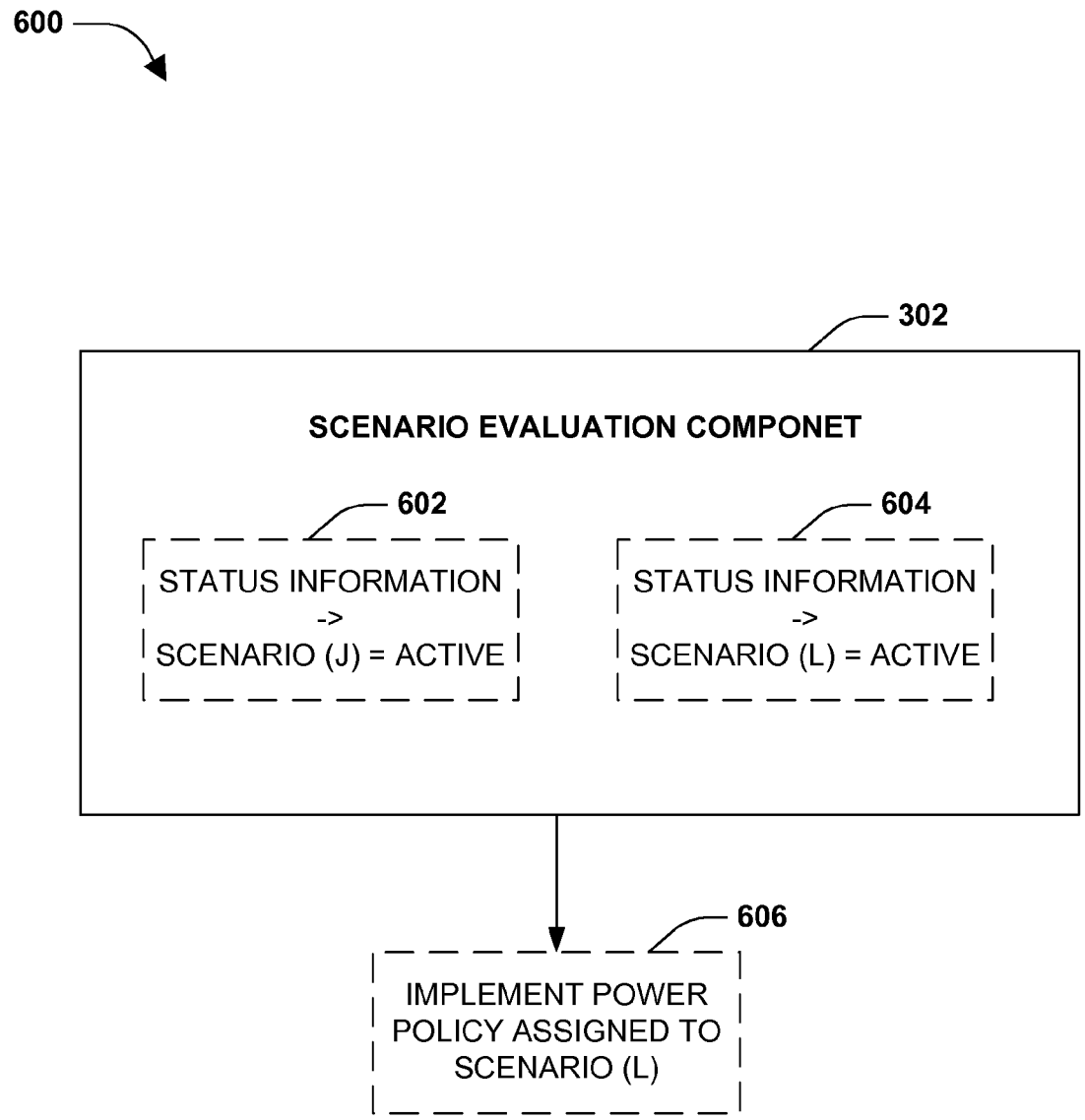
FIG. 6 is an illustration of an example of resolving a conflict between multiple power policies.

FIG. 6 illustrates an example 600 of resolving a conflict between multiple power policies. A scenario evaluation component 302 may be configured to perform a scenario evaluation for a computing environment by evaluating status information provided by one or more activity components. The scenario evaluation component 302 may determine that the status information indicates that a scenario (J) 602 is activated and that a scenario (L) 604 is activated. The scenario evaluation component 302 may perform collision detection to identify whether a conflict exists. For example, a conflict may exist where a power policy for the scenario (J) specifies a CPU clock speed increase, whereas a power policy for the scenario (L) specifies a CPU clock speed decrease. Accordingly, the scenario evaluation component 302 may resolve the conflict to identify a resolved power policy (e.g., selection of a default power policy, maintaining a current power policy, selection of a power policy that increases performance, selection of a power policy that increases power conservation, etc.). For example, the power policy assigned to scenario (L) may be selected as the resolved power policy that may be implemented 606 as a current power policy for the computing environment (e.g., because the power policy assigned to scenario (L) may increase performance).

Figure 7:
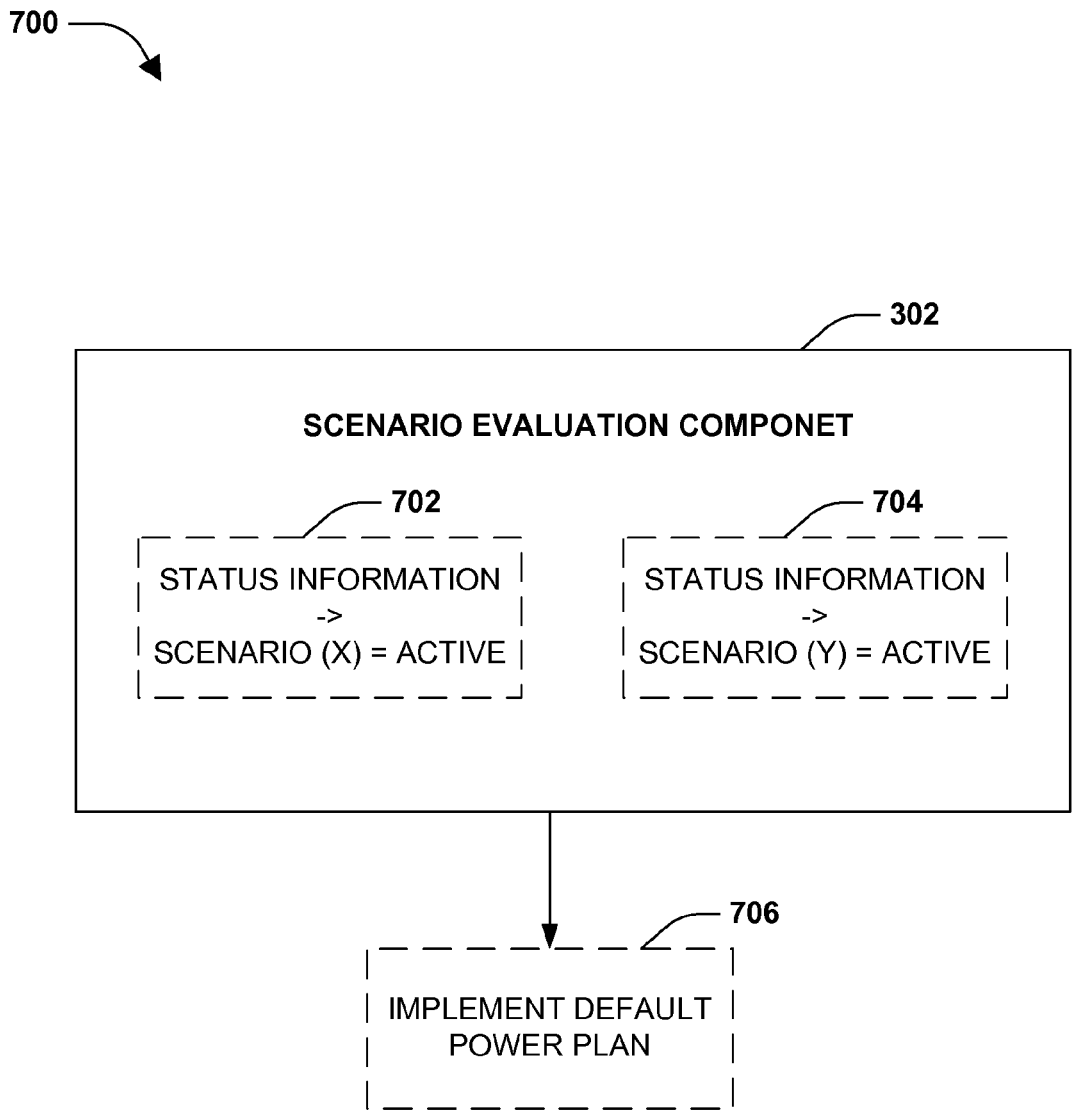
FIG. 7 is an illustration of an example of resolving a conflict between multiple power policies.

FIG. 7 illustrates an example 700 of resolving a conflict between multiple power policies. A scenario evaluation component 302 may be configured to perform a scenario evaluation for a computing environment by evaluating status information provided by one or more activity components. The scenario evaluation component 302 may determine that the status information indicates that a scenario (X) 702 is activated and that a scenario (Y) 704 is activated. The scenario evaluation component 302 may perform collision detection to identify whether a conflict exists. For example, a conflict may exist where a power policy for the scenario (X) specifies a screen brightness of 50%, whereas a power policy for the scenario (Y) specifies a screen brightness of 100%. Accordingly, the scenario evaluation component 302 may resolve the conflict to identify a resolved power policy (e.g., selection of a default power policy, maintaining a current power policy, selection of a power policy that increases performance, selection of a power policy that increases power conservation, implementing an average power policy value such as 75% screen brightness, etc.). For example, a default power plan (e.g., screen brightness of 82%) may be selected as the resolved power policy that may be implemented 706 as a current power policy for the computing environment.

Figure 8:
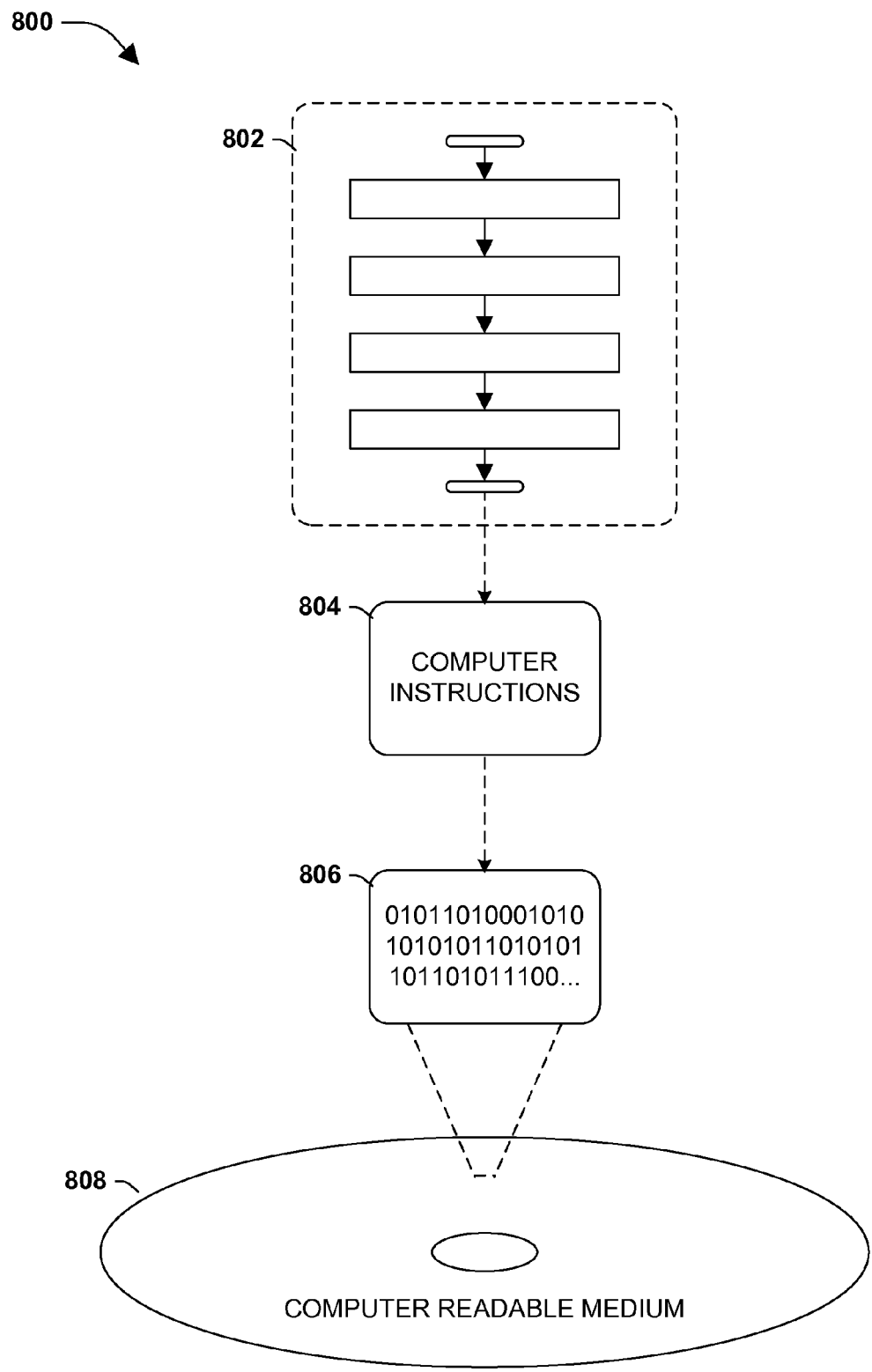
FIG. 8 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 8, wherein the implementation 800 comprises a computer-readable medium 808, such as a CD-R, DVD-R, flash drive, a platter of a hard disk drive, etc., on which is encoded computer-readable data 806. This computer-readable data 806, such as binary data comprising at least one of a zero or a one, in turn comprises a set of computer instructions 804 configured to operate according to one or more of the principles set forth herein. In some embodiments, the processor-executable computer instructions 804 are configured to perform a method 802, such as at least some of the exemplary method 100 of FIG. 1, for example. In some embodiments, the processor-executable instructions 804 are configured to implement a system, such as at least some of the exemplary system 500 of FIG. 5, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
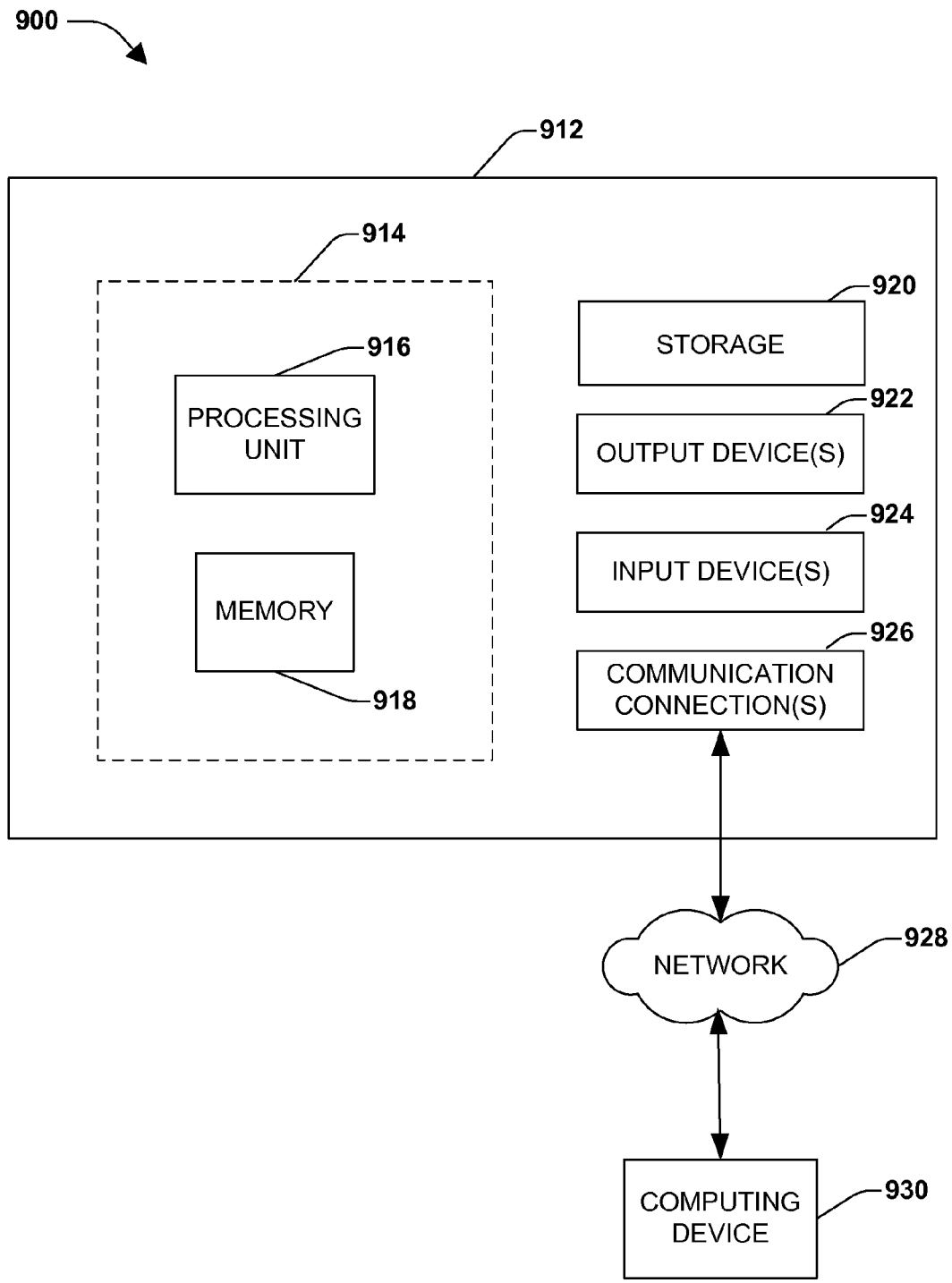
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

What is claimed is:

1. A method for dynamically applying a power policy to a computing environment, comprising:
   accessing a scenario data structure comprising a scenario definition for a scenario;
   performing a scenario evaluation for a computing environment, the scenario evaluation comprising evaluating status information provided by one or more activity components of the computing environment to determine whether the status information satisfies the scenario definition for the scenario;
   accessing a power policy data structure comprising one or more power policy entries;
   responsive to satisfaction of the scenario definition, identifying a proposed power policy of the one or more power policy entries which is associated with the scenario; and
   responsive to the proposed power policy being different than a current power policy, applying the proposed power policy to the computing environment as the current power policy.

2. The method of claim 1, comprising:
   performing the scenario evaluation based upon a notification from an activity component that a status of the activity component has changed.

3. The method of claim 1, comprising:
   responsive to determining that the status information satisfies a second scenario definition for a second scenario, performing collision detection to identify whether a conflict exists;
   resolving the conflict to identify a resolved power policy; and
   applying the resolved power policy to the computing environment as the current power policy.

4. The method of claim 1, the status information comprising an indication of whether an activity component state of an activity component is activated or deactivated.

5. The method of claim 1, comprising:
   maintaining a plurality of scenarios within the scenario data structure, each scenario entry within the scenario data structure defining a scenario definition for a distinct scenario.

6. The method of claim 5, comprising:
   receiving a definition for a new scenario to add into the scenario data structure; and
   creating a new scenario entry within the scenario data structure, the new scenario entry defining a new scenario definition for the new scenario.

7. The method of claim 5, comprising:
   receiving an update for the scenario entry within the scenario data structure; and
   modifying the scenario definition based upon the update.

8. The method of claim 5, the scenario data structure comprising a registry key.

9. The method of claim 1, the scenario definition comprising at least one of:
   one or more compliance activity component states that are to be satisfied for satisfaction of the scenario definition;
   one or more ignored activity component states that are optional for satisfaction of the scenario definition; or one or more disabling activity component states indicating that the scenario definition is not capable of being satisfied.

10. The method of claim 1, comprising:
maintaining a set of power policies within a power policy data structure, a first power policy entry within the power policy data structure defining an association between a first scenario and a first power policy.

11. The method of claim 10, comprising:
receiving an update for the first power policy entry within the power policy data structure; and
modifying the first power policy based upon the update.

12. The method of claim 1, at least one of the proposed power policy or the current power policy corresponding to at least one of a policy definition specified by an operating system, a policy definition specified through a policy engine plug-in, or a policy definition discovered at boot time.

13. The method of claim 1, at least one of the performing a scenario evaluation or the applying the proposed power policy performed at runtime during operation of a computing device.

14. The method of claim 1, comprising:
maintaining a set of activity components within an activity component data structure, an activity component entry within the activity component data structure defining an activity component.

15. The method of claim 14, comprising:
receiving an update to the activity component data structure, the update corresponding to at least one of an activity component removal update, an add new activity component update, or an activity component modification update; and
updating the activity component data structure based upon the update.

16. A system for dynamically applying a power policy to a computing environment, the system comprising:
one or more computer processors;
one or more computer readable storage devices having encoded therein instructions which, when executed by the one or more computer processors, cause the system to:
access a scenario data structure comprising a scenario definition for a scenario;
perform a scenario evaluation for a computing environment, the scenario evaluation comprising at least one of identifying a platform characteristic of a device hosting the computing environment or evaluating status information provided by one or more activity components of the computing environment to determine whether the status information satisfies the scenario definition for the scenario;
accessing a power policy data structure comprising one or more power policy entries;
responsive to satisfaction of the scenario definition, identify a proposed power policy of the one or more power policy entries which is associated with the scenario, the proposed power policy comprising a first value based upon the platform characteristic; and
responsive to the proposed power policy being different than a current power policy, apply the proposed power policy to the computing environment as the current power policy.

17. The system of claim 16, the scenario evaluation module configured to:
maintain a plurality of scenarios within the scenario data structure, each scenario entry within the scenario data structure defining a scenario definition for a distinct scenario;
responsive to receiving a definition for a new scenario to add into the scenario data structure, create a new scenario entry within the scenario data structure, the new scenario entry defining a new scenario definition for the new scenario; and
responsive to receiving an update for the scenario entry within the scenario data structure, modify the scenario definition based upon the update.

18. The system of claim 16, the power policy module configured to:
maintain a set of power policies within a power policy data structure, a first power policy entry within the power policy data structure defining an association between a first scenario and a first power policy; and
responsive to receiving an update for the first power policy entry within the power policy data structure, modify the first power policy based upon the update.

19. The system of claim 16, comprising:
an activity component module configured to:
maintain a set of activity components within an activity component data structure, an activity component entry within the activity component data structure defining an activity component; and
responsive to receiving an update to the activity component data structure, update the activity component data structure based upon the update, the update corresponding to at least one of an activity component removal update, an add new activity component update, or an activity component modification update.

20. A computer program product comprising one or more computer readable storage devices having encoded therein instructions which, when executed at least in part via a processing unit, perform operations for dynamically applying a power policy to a computing environment, comprising:
accessing a scenario data structure comprising a scenario definition for a scenario;
performing a scenario evaluation for a computing environment, the scenario evaluation comprising evaluating status information provided by one or more activity components of the computing environment to determine whether the status information satisfies the scenario definition for the scenario;
responsive to satisfaction of the scenario definition, identifying a proposed power policy of the one or more power policy entries which is associated with the scenario; and
responsive to the proposed power policy being different than a current power policy, applying the proposed power policy to the computing environment as the current power policy.

* * * * *